United States Patent
Hewitt et al.

(10) Patent No.: US 6,825,766 B2
(45) Date of Patent: Nov. 30, 2004

(54) INDUSTRIAL DATA CAPTURE SYSTEM INCLUDING A CHOKE POINT PORTAL AND TRACKING SOFTWARE FOR RADIO FREQUENCY IDENTIFICATION OF CARGO

(75) Inventors: Matthew C. Hewitt, Clio, MI (US);
Travis M. Parrent, Utica, MI (US);
Tim Hobson, Birch Run, MI (US);
Martin Genei, Hartland, MI (US)

(73) Assignee: Genei Industries, Inc., Saginaw, MI (US)

( * ) Notice: Subject to any disclaimer, the term of this patent is extended or adjusted under 35 U.S.C. 154(b) by 152 days.

(21) Appl. No.: 10/029,053

(22) Filed: Dec. 21, 2001

(65) Prior Publication Data

US 2003/0117268 A1 Jun. 26, 2003

(51) Int. Cl.[7] ............................................. G08B 13/14
(52) U.S. Cl. ....................... 340/572.7; 340/5.92; 705/28
(58) Field of Search ........................... 340/572.7, 572.1, 340/5.92; 705/22, 28; 235/385

(56) References Cited

U.S. PATENT DOCUMENTS

| | | | |
|---|---|---|---|
| 3,706,094 A | 12/1972 | Cole et al. .................... | 342/44 |
| 4,058,217 A | 11/1977 | Vaughan et al. ............ | 209/559 |
| 4,471,345 A | 9/1984 | Barrett, Jr. ................ | 340/572.1 |

(List continued on next page.)

Primary Examiner—Thomas J Mullen, Jr.
(74) Attorney, Agent, or Firm—Gifford, Krass, Groh, Sprinkle, Anderson & Citkowski, P.C.

(57) ABSTRACT

A radio frequency identification (RFID) capture system for identifying and recording information parameters associated with cargo items. A choke point portal defines a doorway through which passes a plurality of the cargo items in transit from a first location to a second location. The portal includes a radio frequency scanner and a plurality of antennas mounted at specified locations along said portal and in operative communication with said scanner for issuing a radio frequency signal scan across a three dimensional space preceding the portal doorway. A plurality of radio frequency sensitive labels are affixed to selected cargo items. A processor based operating system is in interfacing communication with the portal scanner. In response to each of the labels signaling a selected portal antenna and processor, the processor system captures the information from scanner and, upon comparing the information with an inventory manifest held in a computer readable medium, records the transport of the cargo item.

18 Claims, 18 Drawing Sheets

U.S. PATENT DOCUMENTS

| | | | |
|---|---|---|---|
| 4,651,156 A | 3/1987 | Martinez | 342/457 |
| 4,673,932 A | 6/1987 | Ekchian et al. | 340/10.32 |
| 4,739,328 A | 4/1988 | Koelle et al. | 342/44 |
| 4,782,345 A | 11/1988 | Landt | 343/727 |
| 4,786,907 A | 11/1988 | Koelle | 342/51 |
| 4,853,705 A | 8/1989 | Landt | 343/803 |
| 4,862,160 A | 8/1989 | Ekchian et al. | 340/10.32 |
| 5,030,807 A | 7/1991 | Landt et al. | 235/375 |
| 5,086,300 A | 2/1992 | Ashmore | 342/20 |
| 5,194,856 A | 3/1993 | Zijlstra | 340/5.9 |
| 5,410,315 A | 4/1995 | Huber | 342/10.32 |
| 5,550,547 A | 8/1996 | Chan et al. | 342/42 |
| 5,565,858 A | 10/1996 | Guthrie | 340/10.33 |
| 5,661,457 A | 8/1997 | Ghaffari et al. | 340/572.7 |
| 5,673,037 A | 9/1997 | Cesar et al. | 340/10.32 |
| 5,726,630 A | 3/1998 | Marsh et al. | 340/572 |
| 5,777,561 A | 7/1998 | Chieu et al. | 340/10.32 |
| 5,883,592 A | 3/1999 | Schepps et al. | 342/44 |
| 5,893,132 A | 4/1999 | Huffman et al. | 715/532 |
| 5,939,984 A | 8/1999 | Brady et al. | 340/572.1 |
| 5,942,987 A | 8/1999 | Heinrich et al. | 340/10.42 |
| 6,034,603 A | 3/2000 | Steeves | 340/10.2 |
| 6,057,756 A | 5/2000 | Engellenner | 340/505 |
| 6,075,707 A | 6/2000 | Ferguson et al. | 361/750 |
| 6,094,173 A * | 7/2000 | Nylander | 340/572.7 X |
| 6,104,291 A | 8/2000 | Beauvillier et al. | 340/572.1 |
| 6,121,878 A | 9/2000 | Brady et al. | 340/572.1 |
| 6,122,329 A | 9/2000 | Zai et al. | 375/329 |
| 6,128,549 A | 10/2000 | Swartz et al. | 700/225 |
| 6,150,921 A | 11/2000 | Werb et al. | 340/10.1 |
| 6,154,137 A | 11/2000 | Goff et al. | 340/572.4 |
| 6,184,841 B1 | 2/2001 | Shober et al. | 343/853 |
| 6,204,764 B1 | 3/2001 | Maloney | 340/568.1 |
| 6,229,445 B1 | 5/2001 | Wack | 340/572.7 |
| 6,232,870 B1 | 5/2001 | Garber et al. | 340/10.1 |
| 6,236,223 B1 | 5/2001 | Brady et al. | 324/765 |
| 6,236,836 B1 | 5/2001 | Westman et al. | 455/38.3 |
| 6,237,051 B1 | 5/2001 | Collins | 710/36 |
| 6,249,227 B1 | 6/2001 | Brady et al. | 340/572.1 |
| 6,259,991 B1 | 7/2001 | Nysen | 701/300 |
| 6,271,756 B1 | 8/2001 | Davies, Jr. et al. | 340/572.7 |
| 2002/0038267 A1 * | 3/2002 | Can et al. | 705/28 |
| 2002/0041234 A1 * | 4/2002 | Kuzma et al. | 340/572.8 |
| 2002/0044096 A1 * | 4/2002 | Chung | 343/742 |
| 2002/0089434 A1 * | 7/2002 | Ghazarian | 340/988 |
| 2002/0104013 A1 * | 8/2002 | Ghazarian | 713/200 |

* cited by examiner

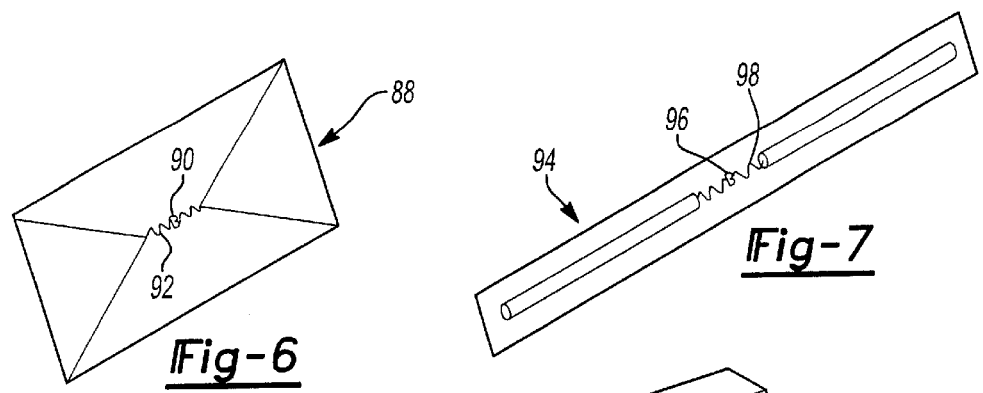
Fig-6
Fig-7
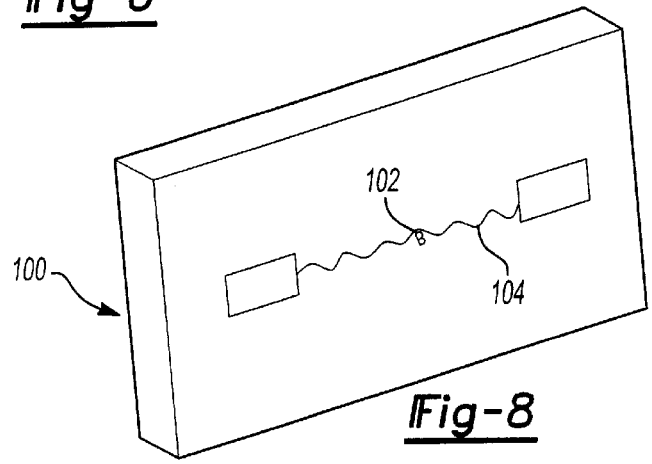
Fig-8
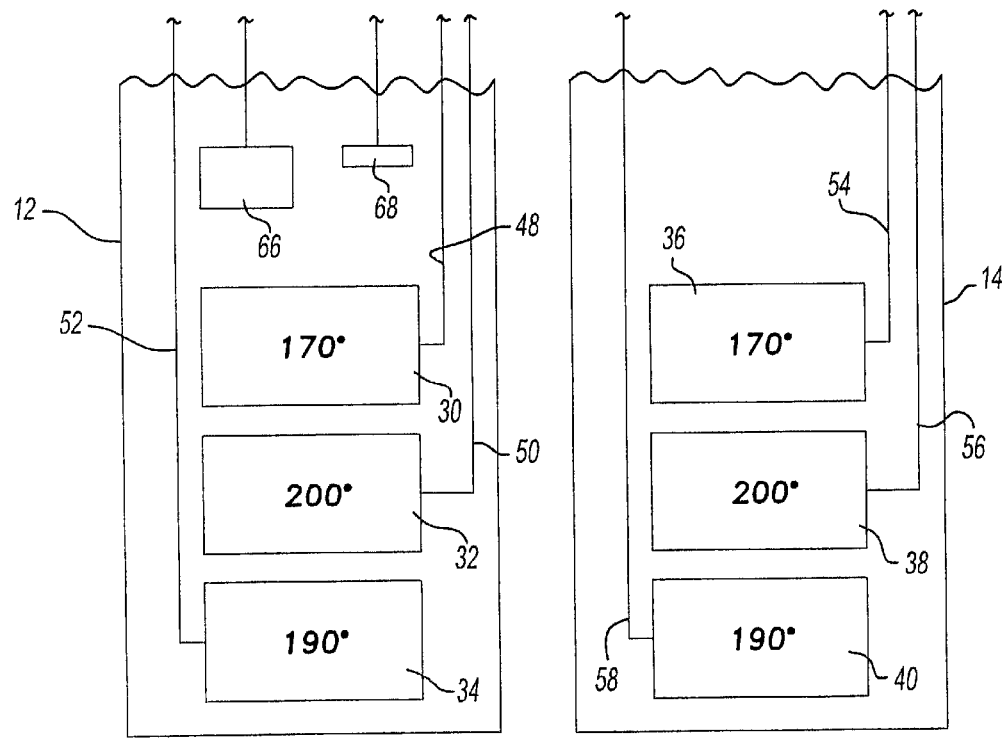
Fig-9
Fig-10

System Settings

110 — Scanner Settings # of Antennas: 2
COM Port: COM1
Baud Rate: 57600
Cloak: Don't Cloak

Poll Time [ms]: 10
End Flag: 33303
Read Address: 2
Read Length: 2

112 —

Network Settings

Network Server? ☑
Network Timeout: 5
Valid IP's: 10.0.0.;
Separate IP's with semicolon [;] also ending an IP with a period signifies that entire subnet TCP Port: 5423
Network Monitor Inerval: 2

108

DataBase Settings

114 — DataBase Type: ACCESS
DataBase Name: D:\PSI\PSI.MDB
System DataBase: D:\PSI\SYSTEM.MDW 116 — OK
118 — Cancel

File  Settings  Help

WAITING

Enter A container Load, then click GO

Container Load: 
Read: ⎯ 128
130 — GO

Network Server Enabled
No Session

INDUSTRIAL DATA CAPTURE SYSTEM INCLUDING A CHOKE POINT PORTAL AND TRACKING SOFTWARE FOR RADIO FREQUENCY IDENTIFICATION OF CARGO

BACKGROUND OF THE INVENTION

1. Field of the Invention

The present invention relates generally to inventory tracking and, more specifically, to radio frequency identification (RFID) systems. More specifically, the present invention discloses an industrial data capture system which utilizes a unique array of RFID scanner/antennas built into a choke-point portal, as well as RFID labels affixed to containers/units to be transported through the portal. Tracking software/hardware interfaces with the RFID scanner(s) and antennas in the choke point portal for interrogating and identifying specified information parameters associated with each of the label affixed containers. Additional aspects of the software/hardware include the ability to automatically identify load amounts associated with the cargo to be scanned (Unit Load Evaluation), as well as printing out shipping manifests and exporting information to shipping programs or other third party programs (Integrated Shipping Solutions).

2. Description of the Prior Art

The prior art is well documented with examples of radio frequency identification (again RFID) devices and systems. The underlying technology involved with RFID systems is, by itself, reasonably well known in the art and includes such essential components as a scanner, with an antenna, for issuing a frequency specific signal. One or more labels (or tags) is affixed to an asset or article of some sort to be tracked and, upon the label or tag being subjected to the frequency specific signal, is energized to issue a response signal read by processor components interfacing or built into the scanner. The response signals provide such information as geographic position of the article/asset or an identification of the contents of the asset.

A significant number of prior art patents explain in additional detail specific technical applications of RFID systems and a first example of this is set forth in U.S. Pat. No. 6,150,921, issued to Werb et al., which teaches a system for tracking mobile tags. Cell controllers with multiple antenna modules generate a carrier signal received by the tags, which in turn shift the frequency of the carrier signal, modulate an identification code onto it, and transmit the resulting tag signal at randomized intervals. The antennas in turn receive and process the response, and determine of the presence of the tags by proximity and triangulation. Distance of a tag from an antenna is then calculated by measuring a round trip signal time and the cell controllers export data from the antenna to a host computer which, upon collecting the data, resolves them into positional estimates which are archived in a data warehouse such as an SQL Server.

U.S. Pat. No. 6,237,051, issued to Collins, teaches asset tracking within and across enterprise boundaries. A data label is secured to each asset to be tracked, as well as for each location in the enterprise. Locational history data of the asset is related to other asset data in a relational database. Assets typically include system components and the data label, in the preferred embodiment, is a code label utilizing a code which ensures that each label is unique to the asset or location to which it is attached, the location further being defined as both geographical coordinate locations, as well as location identity within which the asset (or other system component) may be housed. In response to a scanned asset label, a menu of allowable activities is presented which so that the person assigned to an asset-associated task may easily make entries into the database of the code assigned to the task performed and which, in addition to the asset data and location aspects, provides tracking of components of complex systems over time and in order to build complex relational records.

Finally, U.S. Pat. No. 5,777,561, issued to Chieu et al., teaches a method for selecting groups of radio frequency (RF) transponders (or tags) for communication between a base station and the tags. The tags are selected into groups according to physical attributes of the signal sent by the tags to the base station, or according to the physical response of the tags to a physical attribute of the signal sent from the base station to the tags in order to simplify and reduce the time frame for communication with the tags.

SUMMARY OF THE PRESENT INVENTION

As stated previously, the present invention discloses an industrial data capture system which utilizes a unique array of RFID scanner/antennas built into a choke-point portal, as well as RFID labels affixed to containers/units to be transported through the portal and a tracking software/hardware interface, with the RFID scanner(s) and antennas, for interrogating and identifying specified information parameters associated with each of the label affixed containers. The data capture system and method provides significant improvements, over such as conventional barcode and data entry technologies, in both accuracy of data collection and retention, as well as time savings, ranging from a multiple factor of 100 to 1000 times faster, respectively than these prior art technologies.

A "U" shaped, portal is provided with first and second upwardly extending sides and an interconnecting top which defines a doorway. The portal is located at a "choke point" location through which cargo (or freight) must pass and such as between a warehouse location within a facility and a truck loading area. Built into the portal is an RFID scanner and a plurality of nine antennas, typically three (3) being located per each of the three interconnected sides defining the portal. The antennas are uniquely arranged in both position and angular array so that they substantially cover the three dimensional space preceding the portal doorway.

Each of the cargo or freight containers includes an affixable label, the label including a simplified circuit which, upon being energized by a scanning field emanating from the RFID portal antennas, such field typically being according to a specified frequency range, issues an output signal. Upon reading a signal outputted from each of the labels, a selected antenna transmits this information to the portal scanner which in turn deactivates the tag to prevent it from being multiply scanned.

Both computerized software and hardware, in the form of an on-site (or remotely located) software based operating system working in combination with a portable and vehicle (forklift) operated computer system (portable palm or laptop) is provided and receives information from the portal scanner (an optional CPU) as to the container labels being scanned. The operating software confers with a manifest of all cargo within the facility and, as a label pre-identified and associated by that manifest with a given cargo is scanned, the system acknowledges this and updates the manifest.

The software provides a wide array of features to the present invention, including, according to its main embodiment, the ability to automatically and quickly identify cargo being transported through the portal for shipping from the location. Additional software based features include the ability of the system to automatically evaluate and identify a unit load (ULE), concurrent with scanning that load which is supported upon a forklift and without the necessity of the lift operator pre-entering the cargo quantity.

Another software module is identified as an integrated shipping solution (ISS) and which allows the gathering of information, such as into a compiled file corresponding to a given truckload of cargo, and for printout or export to third party programs or applications. A remote portal scanning interface (RPSI) works in combination with remote located terminals (such as a forklift mounted laptop or Palm Pilot®) and in order to communicate the software program which operates the portal scanning interface (PSI) and to thereby allow the fork operator to remotely control (or override) the portal.

Additional envisioned aspects of the software component include the provision of customer order interfaces (COI) which allow orders to be entered into the system, and which can then be selected from the PSI or RPSI modules for filling. The structural aspects of the portal, with its scanner and array of antennas, as well as the software program embodying a code for use with a computer writeable media, are both also claimed as part of the present invention.

BRIEF DESCRIPTION OF THE DRAWINGS

Reference will now be made to the attached drawings, when read in combination with the following detailed description, wherein like reference numerals refer to like parts throughout the several views, and in which:

FIG. 6 is an exemplary illustration of a first type of RFID tag for adhesive attachment to a non-metallic cargo container;

FIG. 7 is an exemplary illustration of a second type of RFID tag for attachment to a non-metallic cargo container;

FIG. 8 is a further and exemplary illustration of a third type of RFID tag for attachment to a metallic cargo container;

FIG. 9 is a schematic configuration of a first selected and right side of the portal and which illustrates both a wiring and first multiple antenna configuration;

FIG. 10 is a schematic configuration of a second selected and left side of the portal and, similarly to FIG. 5, again illustrates both wiring and a second multiple antenna configuration;

FIG. 14 is a screen illustration of initial settings of the software and inputting parameters such as terms to be read from tags, the COM port the portal is attached to, number of antennas to use, network setting and database settings;

FIG. 15 is an illustration of an opening program screen according to a first preferred variant of the software and which provides a key entered input parameter for designating a quantity of cargo to be transported, and such as may be designated upon a vehicle mounted computer which is in communication with the software;

DETAILED DESCRIPTION OF THE PREFERRED EMBODIMENTS

Figure 1:
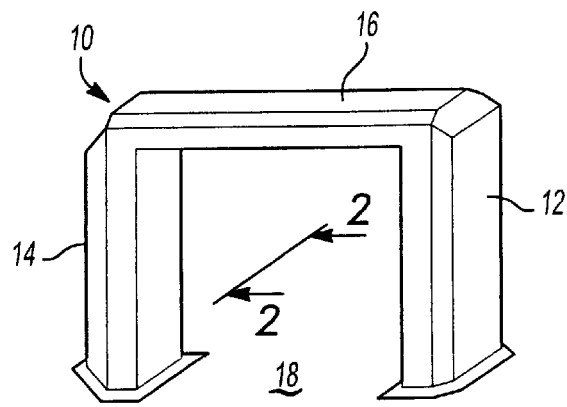
FIG. 1 is a structural illustration, in perspective, of the choke point portal according to a first preferred embodiment of the present invention.
Figure 2:
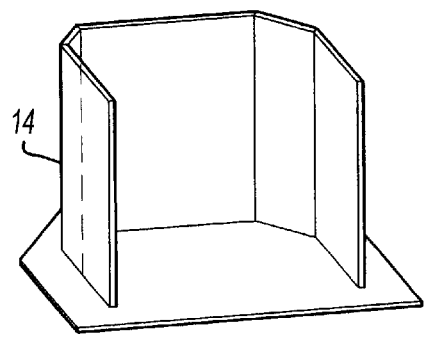
FIG. 2 is a sectional cutaway taken along line 2—2 of FIG. 1 and showing the general shape of a given side of the portal according to the present invention.

With reference now to FIGS. 1–5, various illustrations are presented of a standing portal 10 forming a component of the data capture system and method according to the present invention. As previously explained, the present invention utilizes a unique array of RFID scanner/antennas built into a choke-point portal, as well as RFID labels affixed to containers/units to be transported through the portal and a tracking software/hardware interface, with the RFID scanner (s) and antennas, for interrogating and identifying specified information parameters associated with each of the label affixed containers. The data capture system and method provides significant improvements, over such as conventional barcode and data entry technologies, in both accuracy of data collection and retention, as well as time savings, ranging from a multiple factor of 100 to 1000 times faster, respectively than these prior art technologies.

Referring again to the structural illustrations of FIGS. 1–5, the portal 10 according to the present invention includes first 12 and second 14 spaced apart and upwardly extending sides. A top 16 extends in crosswise and interconnecting fashion between the upwardly extending sides 12 and 14 and, therebetween, defines a portal doorway 18 for providing passage therethrough of items of cargo (see at 20 in FIG. 5) and such as is supported upon an intermediate cargo transport vehicle 22 such as is commercially known as a powered forklift. Referring further to the cutaway views of FIGS. 2 and 4, the cross-sectional polygonal shape of a selected side (in this case second or left side 14) is shown, however it is also understood that the configuration, either along longitudinal or cross section directions of the portal 10, can be easily modified within the scope of the invention.

The portal can be constructed of any desired and suitable material, such as which may facilitate (or at least not interfere with) radio frequency identification (RFID) signaling and as will be further described in more detail. Additionally, the portal 10 can be constructed so as to provide any desired doorway configuration, however it is found that the substantially "U" shape of the portal illustrated at 10 provides for the most effective RFID scanning and, correspondingly, provides the easiest manner for transporting the cargo items therethrough.

Figure 3:
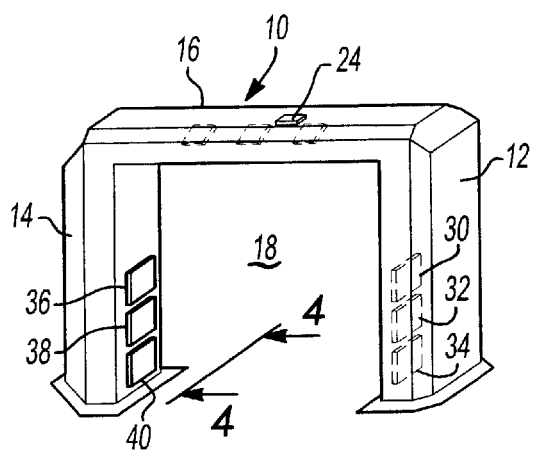
FIG. 3 is a view similar to that shown in FIG. 1 and illustrating the a scanner and multiple antenna arrangement incorporated into the portal according to the present invention.
Figure 4:
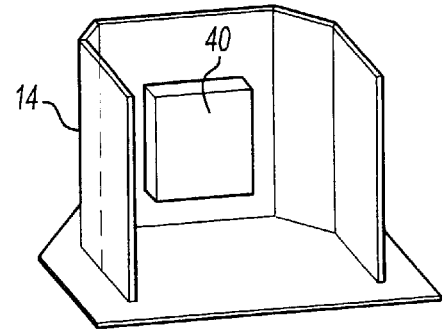
FIG. 4 is a sectional view cutaway taken along line 4—4 of FIG. 3 and showing the manner in which a specified antenna is mounted to the given side of the portal.
Figure 5:
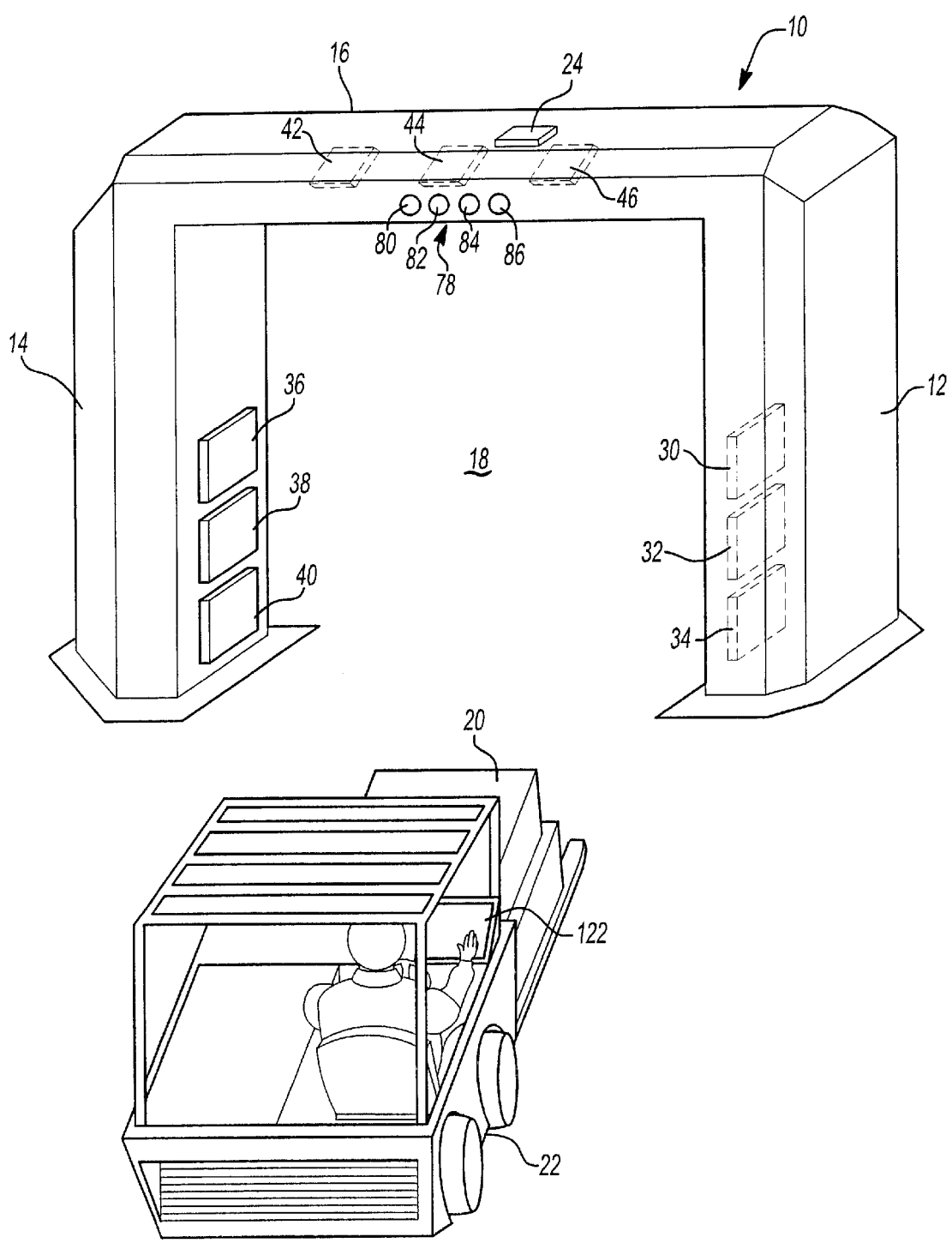
FIG. 5 is an operative view of the choke point portal, substantially as illustrated in FIG. 4, and further showing a forklift with a vehicle mounted PC operating system and screen display.
Figure 11:
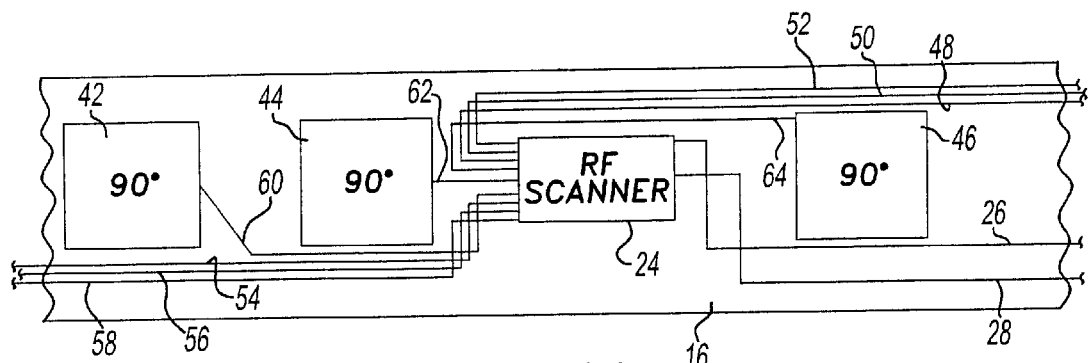
FIG. 11 is a schematic configuration of a top side of the portal and illustrating the positioning of the RF Scanner, wiring and third multiple antenna configuration according to the present invention.

Referring specifically to FIGS. 3, 5, and 11, a radio frequency identification (RFID) scanner 24 is provided. The scanner 24 operates to issue radio frequency scan, in the preferred embodiment within a frequency range approximating within a range between 890 to 930 megahertz (MHz) and with read ranges of typically up to ten feet. As further best illustrated in the top diagrammatic view of FIG. 11, a power supply 26 and serial port output 28 communicate with the scanner 24.

A plurality of antennas are located along the sides 12 and 14 and top 16 and, in combination, scan a three dimensional space preceding the portal doorway 18. In the preferred embodiment, a first sub-plurality of three antennas 30, 32 and 34 are mounted in a substantially vertical array along the first 12 (or right) upwardly extending side. A second sub-plurality of three antennas 36, 38 and 40 are mounted in a likewise manner along the second 14 (or left) upwardly extending side. A third sub-plurality 42, 44 and 46 of three antennas are additionally mounted in a substantially horizontally spaced array along the interconnecting top 16.

As is also known, each of the sub-pluralities of antennas is arranged at offsetting angular increments relative to one another and in order to maximize the efficiency of the RFID signal screen that is created in front of the doorway. Referring to FIGS. 9, 10 and 11 in succession, FIG. 9 illustrates the first sub-plurality of antennas 30, 32 and 34 at 170°, 200° and 190°, respectively, relative to a vertically extending face of the first side 12. Concurrently referring to FIG. 10, the second sub-plurality of portals 36, 38 and 40 extend in likewise angular increments of 170°, 200° and 190° respectively relative to a vertically extending face of the second side 14. Finally, and referring to FIG. 11, the third sub-plurality of portals 42, 44 and 46 extend each at 90° relative to a horizontally extending (downward) face associated with the top 16. It is however understood that a wide range of different antenna combinations and angular positions may be incorporated into the portal structure and so that the desired entryway of the portal doorway is effectively scanned.

As further illustrated in FIGS. 9, 10, 11, communication lines extend between each of the antennas 30, 32, 34, 36, 38, 40, 42, 44 and 46 (see at 48, 50, 52, 54, 56, 58, 60, 62 and 64) and the RF scanner 24. As further shown in the first side diagrammatic view of FIG. 9, a power supply 66 and serial port connection 68 may also be provided.

Figure 12:
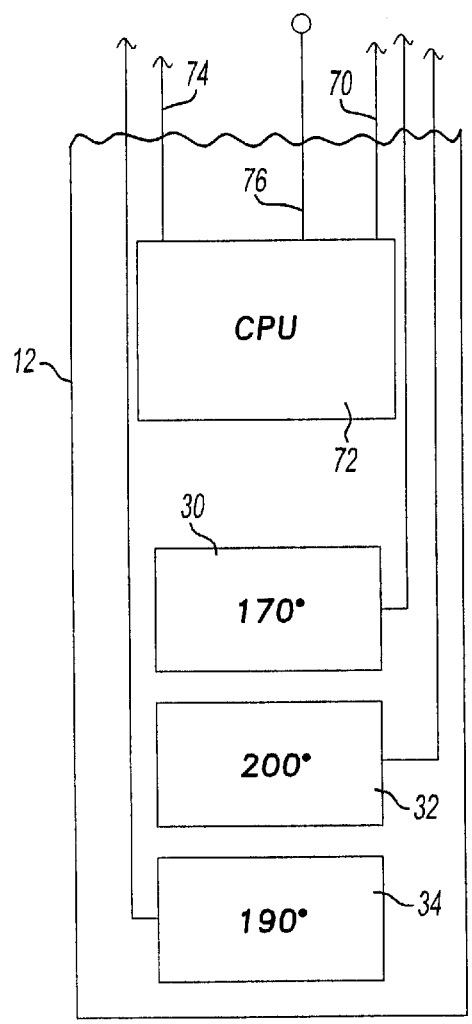
FIG. 12 is a right side wiring and antenna configuration, according to a further preferred variant, and which discloses the incorporation into the portal of a server network CPU.

Referring to FIG. 12, an optional networking unit illustrates a first side 12' of the portal in which antennas 30', 32' and 34' are again located in the fashion substantially identified in the primary embodiment of FIGS. 3, 5, and 9. A power source 70 and central processor unit (CPU) 72, with output serial port 74, are provided and in which the CPU 72 if is networked to a server (not shown) to communicate with the processor based operating system and as will also be described in additional detail. An optional Ethernet connection port 76 is also disclosed in communication with the CPU 72. Referring again to FIG. 5, a traffic lamp signal 78 is positioned in proximate location to the portal 10 (in this instance in integrated and facing manner with respect to its top 16). The lamp signal 78 is communicable with the processor operating system and so that individual first 80, second 82, third 84 and fourth 86 individually colored light portions corresponding, respectively, to selected first, seconds third and fourth subroutine conditions of the operating software, may be illuminated to signal an operating condition of the system.

Referring to FIGS. 6, 7 and 8, in succession, individual types of RFID labels (or tags) are provided. Each of the labels are, by themselves, known in the art and are affixed in some fashion to an item of freight or cargo. As is known in the art, the labels may come in different RFID frequencies and for different read ranges and applications. Application of the labels may further be accomplished by encasing the label in a substrate or packaging, attaching with a zip tie, adhering the label with types of permanent and/or temporary adhesives, or by molding the tag directly into certain types of non-metallic products.

Each of the labels further include a combined circuit and antenna portion and such that, upon sensing an RFID field initiated from the portal scanner and scanner antennas, becomes energized to issue a responsive signal. Specifically, FIG. 6 is an exemplary illustration of a first type of RFID tag 88 for adhesive attachment to a non-metallic cargo container and which includes a circuit chip 90 and antenna 92. FIG. 7 is an exemplary illustration of a second type of RFID tag 94 for attachment to a non-metallic cargo container and which again includes a chip 96 and attached antenna portion 98. Finally, FIG. 8 is a further and exemplary illustration of a third type of RFID tag 100 attachment to a metallic cargo container and which includes a circuit chip 102 and attached antenna portion 104. It is further known that the RFID labels, or tags as is known in the art, are by themselves known technology and it is envisioned that other and additional types of RFID labels can be incorporated into the RFID capture system according to the present invention.

The general operation of each of the labels is such that, upon being energized by the scanner field emanating from the portal, a response signal is issued which is then picked up by a selected one of the plurality of antennas 30–46. To prevent a given tag from being duplicatively read, the portal scanner 24 instructs the tag, again through the antenna array, to deactivate. It is also envisioned that other types of RFID tag reading and deactivation schemes may be incorporated into the present invention.

Having provided a generally adequate explanation of the structural components of the portal 10 and related RFID accessories, a further and more detailed explanation will now be made as to the software based and processor driven operating system for interfacing with the portal RFID scanner 24 and for providing the ability to capture the data associated with the individual labels. In providing this explanation, reference will be made to the overall schematic configuration of FIG. 13, as well as concurrent reference to the succeeding screen illustrations of FIGS. 14–38, which in turn describe both the main embodiment for scanning, comparing and capturing (recording) the data, as well as additional/alternative variants (modules) of the software based system for providing additional capabilities to the system.

Figure 13:
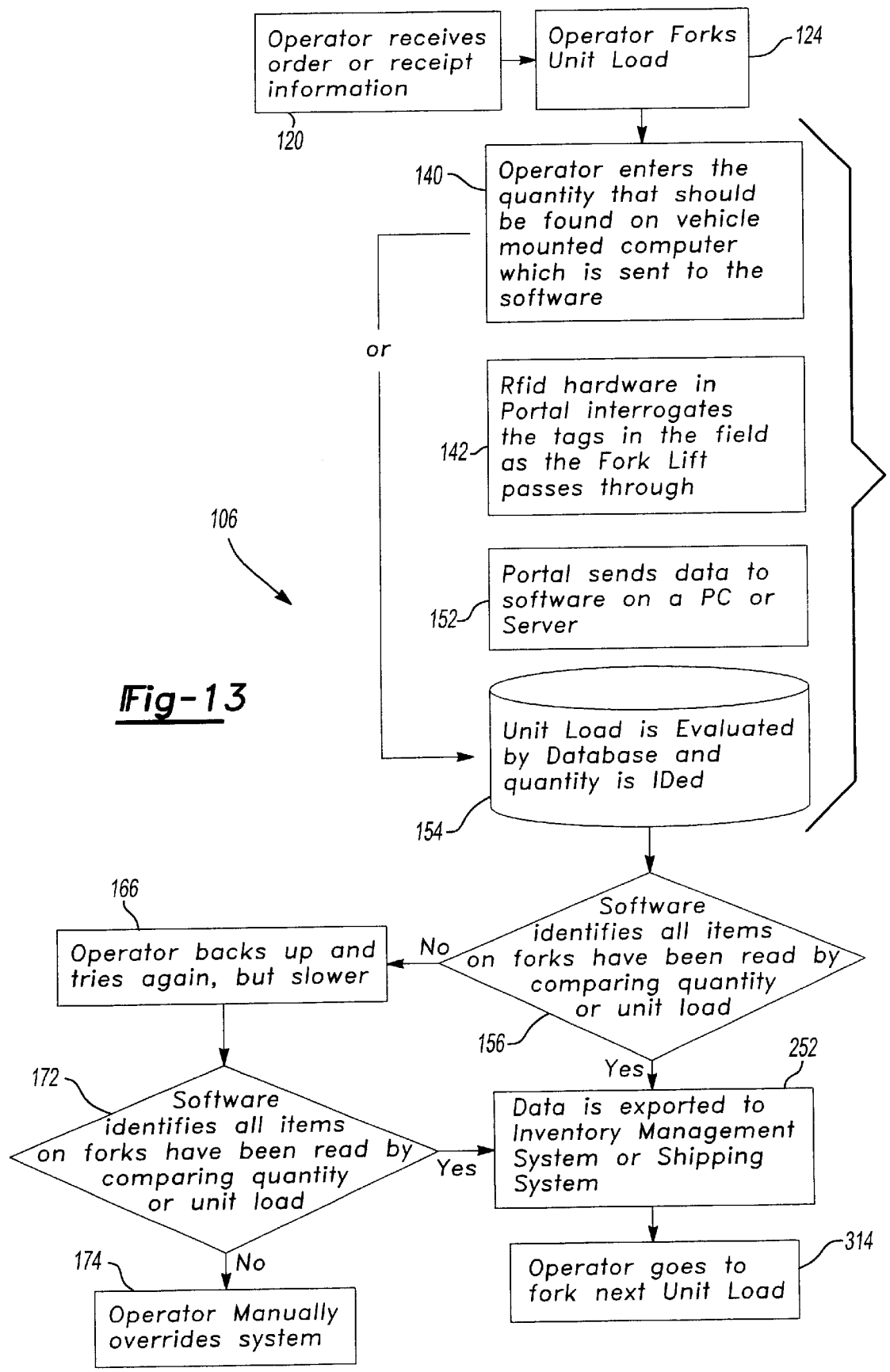
FIG. 13 is a schematic flow diagram illustrating the operating aspects of the software for the data capture system and method according to the present invention.

Accordingly, and referring first to FIG. 13 is a schematic flow diagram is referenced generally at 106 and illustrating the operating aspects of the software the data capture system and method according to the present invention. Referring to FIG. 14, a screen illustration 108 is provided of initial settings of the software and inputting parameters such as terms to be read from tags. These initial settings are necessary in order for the program to operate and are referenced by entry fields corresponding to scanner settings 110, including the COM port the portal is attached to, and number of antennas to use, network settings 112 including network server, network timeout, and database settings 114. An OK button is referenced at 116 and cancel button at 118.

Referring back to FIG. 14, step 120 indicates that the operator (such as of the forklift 22 in FIG. 5) has received an order or other such information to begin a scanning procedure. From a hardware standpoint (reference further being had below as to the corresponding software components) a remote terminal 122 (see again FIG. 5) is provided for interfacing between the remote portal scanning interface (RPSI) and a portal scanning interface (PSI). The remote terminal 122 in essence presents a copy of the main server software and, due to the RPSI capabilities, provides the operator with the ability to override the system in given situations and as will also be further described.

Again with reference to FIG. 14, and at step 124, the operator forks a unit load (corresponding to a given quantity of cargo items with affixed labels for scanning). Referring to FIG. 15, an illustration of an opening program screen is provided at 126 according to the first preferred variant of the software and which provides a key entered input parameter 128 for designating the quantity of cargo (typically what is being held on the forks) to be transported. At this point, the first light portion 80 of the traffic signal 78 in FIG. 5 may be illuminated according to a first selected color, such as red designating an inactive status of the system software. The container load parameter is key entered into the vehicle mounted PC operating system 122 (such as may include a laptop or Palm Pilot device) in the field indicated at 128 and, upon selecting the go button 130, instructs the processor based system to instruct the portal scanner to initial scanning in the field preceding the portal doorway.

Figure 16:
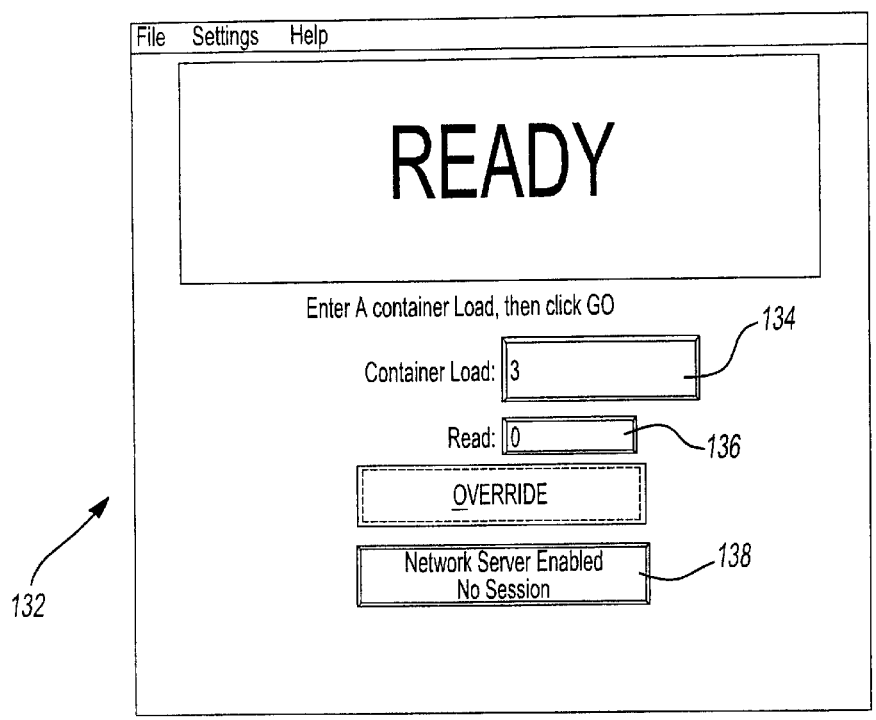
FIG. 16 is a screen illustration signifying that the portal is ready to scan items that will pass through it.
Figure 17:
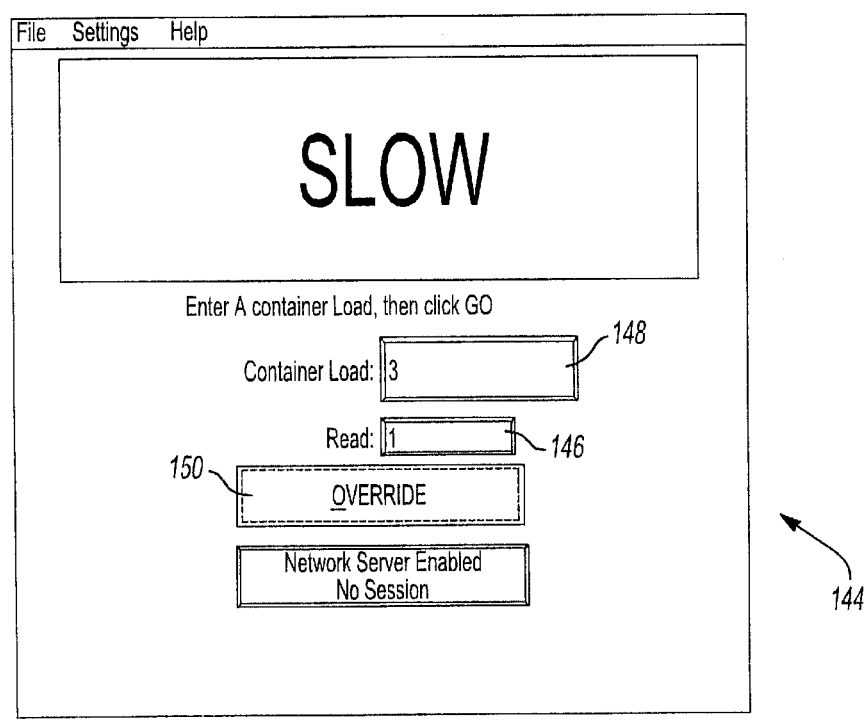
FIG. 17 is a succeeding screen illustration signifying that the portal has read at least one tag and instructing the driver to proceed slowly through the portal to ensure accurate reading of all tags.

Referring to FIG. 16 is a screen illustration 130 signifying that the portal is ready to scan items that will pass through it and including field designations 134 (similar to 128 in FIG. 15) and identifying three (3) items of cargo to be scanned, as well as field designation 136 indicating that no items of cargo have yet been read. At this point, the second signaling light portion 82 may be illuminated, such as according to second color (blue) and designating that the system is ready. An override button 138 is also provided and which, as will be further explained in more detail with reference to FIGS. 21 and 22, allows the operator to override the software system and manually key enter an appropriate scanned load in the event that the system persists in scanning an incorrect number of tags.

Referring back to FIG. 13, and at step 140, the forklift operator has entered, as provided in FIGS. 15 and 16, the correct load that should be found on the forklift and which is, through the RPSI, communicated to the main operating software server, typically at the remote location. At step 142 the RFID hardware in the portal (such as including the scanner 24 and antennas 30–46) interrogates the tags/labels in the field (situated upon the selected cargo items) as the forklift begins passing through the portal doorway. Concurrently, and referring to FIG. 17, a succeeding screen illustration 144 signifies at 146 that the portal has read at least one tag and instructs the driver to proceed slowly through the portal to ensure accurate reading of all tags. At this point, a third succeeding 84 of the individually colored light portions (yellow) indicates that the system has read at least one tag. Container load fields 148 and optional override button 150 are again evident on the screen display of FIG. 17.

At step 152 in FIG. 13, the portal scanner sends data (either through a hard wiring or remote frequency signaling) to the remote server (again not shown) and which corresponds to the signals issued from the labels (tags). At step 154, the unit load is evaluated by a database and such as which maintains an inventory manifest presented in a computer writeable media of some sort. The scanned information is compared and evaluated and, upon adequate identification being determined by the operating software, step 156 instructs the remote system 122 that all items upon the fork have been read.

Figure 18:
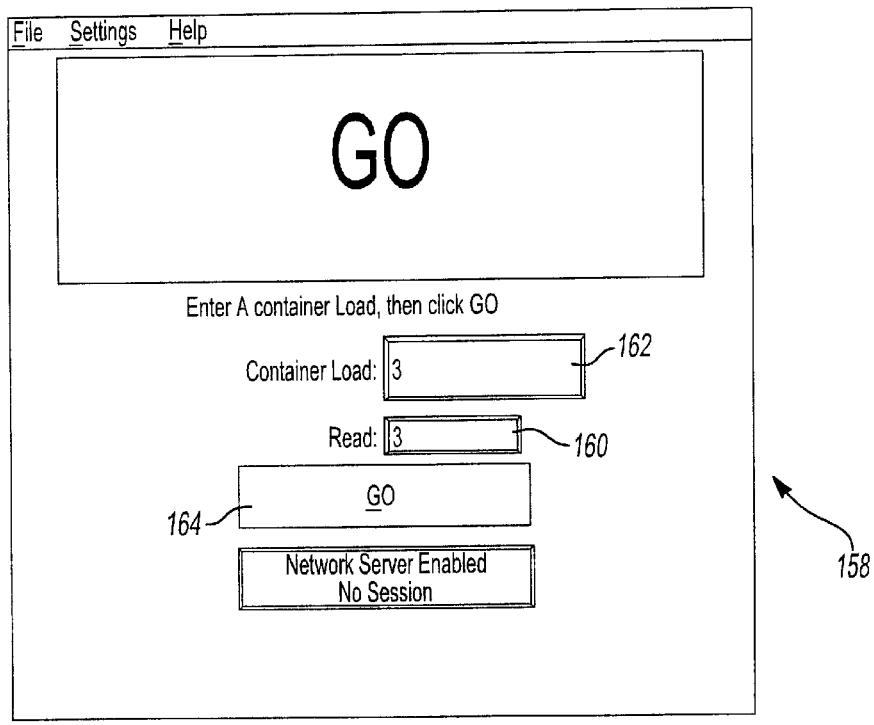
FIG. 18 is a further succeeding illustration signifying that the portal has read all of the tags inputted in the screen of FIG. 15.

Referring to the screen illustration 158 of FIG. 18, the succeeding remote operator screen concurrently identifies that the portal has read all of the tags inputted in the screen of FIG. 15, reference specifically being had to field 160 indicating all three (3) containers of container load field 162 have been read. Go button 164 may be elected to complete the iteration. At this point, the fourth 86 individually colored light portion is illuminated (green) indicating that the load has successfully been scanned. Additionally, and referring again to FIG. 18, the screen illustration may additionally display the green "GO" signal for a short period of time, after which it will return to the initial red "WAITING" signal (FIG. 15).

Figure 19:
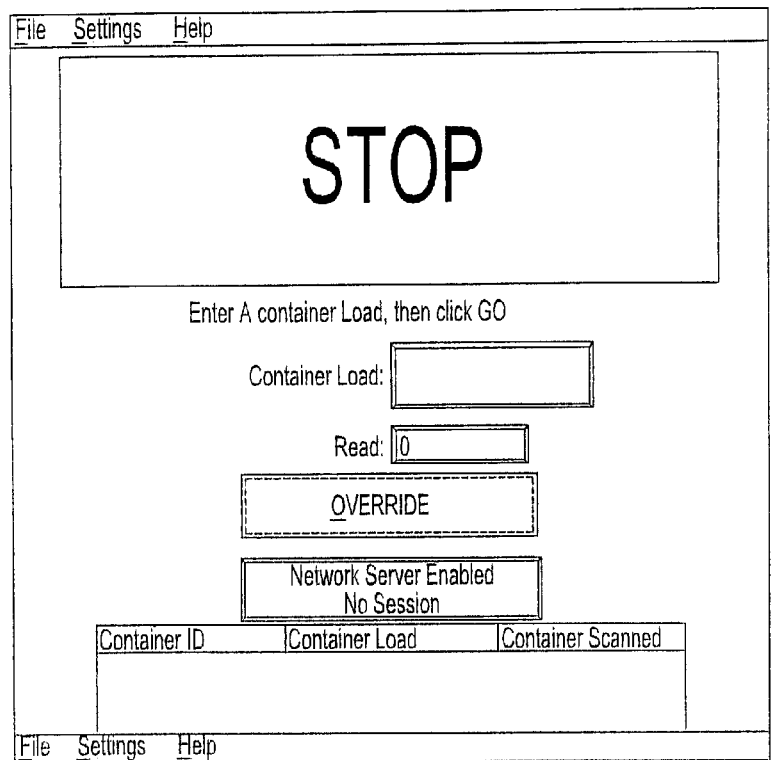
FIG. 19 is a further screen illustration of the system's ability to detect that a forklift, or other suitable cargo transport vehicle, has passed through a scanning field of the portal before all of the tags have been read and the GO screen illustration of FIG. 18 has been given.
Figure 20:
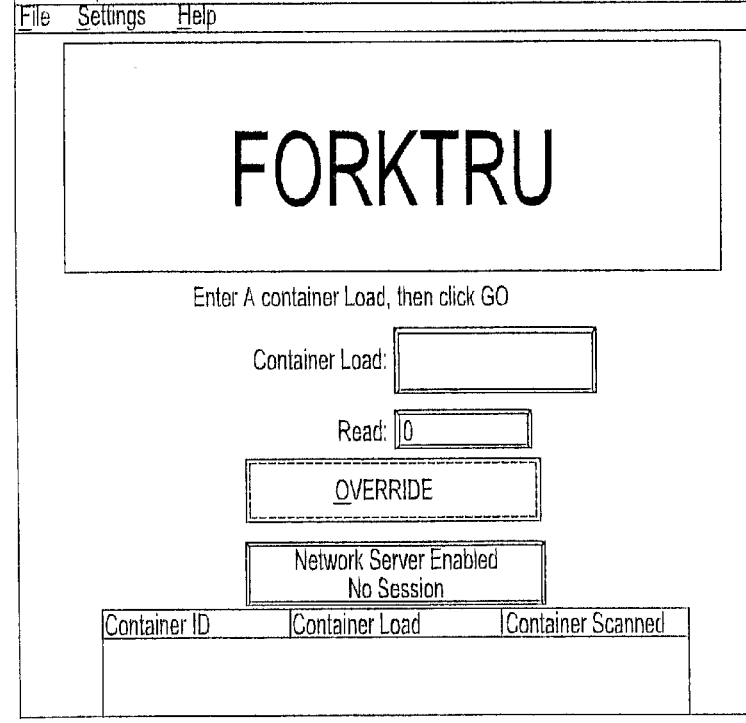
FIG. 20 is a succeeding screen illustration to that shown in FIG. 19 and which resets the system to reinitiate the portal scanner and antennas to begin rereading tags.

Referring back to FIG. 13, step 166 is an alternate progression from previous step 156 and in the instance in which the software has not identified a correct number of labels. As will be further explained, this discrepancy can result from the system either reading too many or too few labels. Referring to FIG. 19, a further screen illustration 168 indicates the system's ability to detect that a forklift, or other suitable cargo transport vehicle, has passed through a scanning field of the portal before all of the tags have been read and the GO screen illustration of FIG. 18 has been given. Referring further to FIG. 20 is a succeeding screen illustration 170 which resets the system to reinitiate the portal scanner and antennas to begin rereading tags. This is typically done by the screen flashing and instructing the operator to back up and return to scanning for tags with either the blue READY 82 or yellow slow 84 signals being illuminated.

Figure 21:
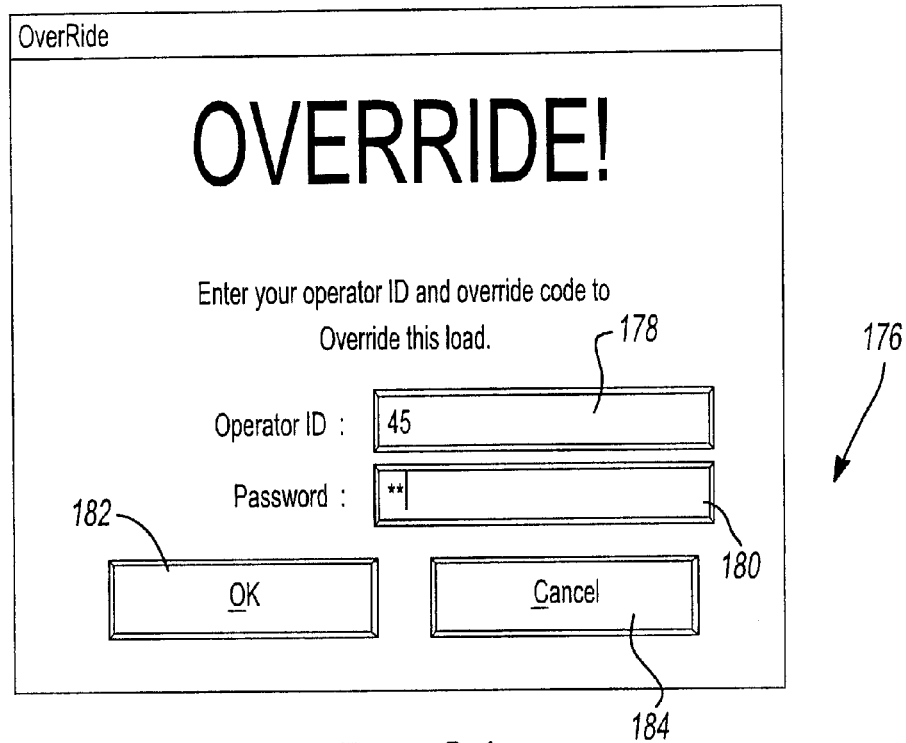
FIG. 21 is an operator and password inputable override screen and which appears in the event the portal cannot scan a full complement of designated cargo.

At step 172 (FIG. 13), the operating software again identifies if all items (containers) on the fork have been read. If there still exists an error in the number of tags read, step 174 instructs the operator to manually override the system. Referring concurrently to FIG. 21, an override screen 176 is presented on the remote display 122 and upon which operator 178 and password 180 inputable parameters are indicated. An OK button 182 or CANCEL button 184 either authorizes or cancels the information parameters (if incorrectly inputted).

Figure 22:
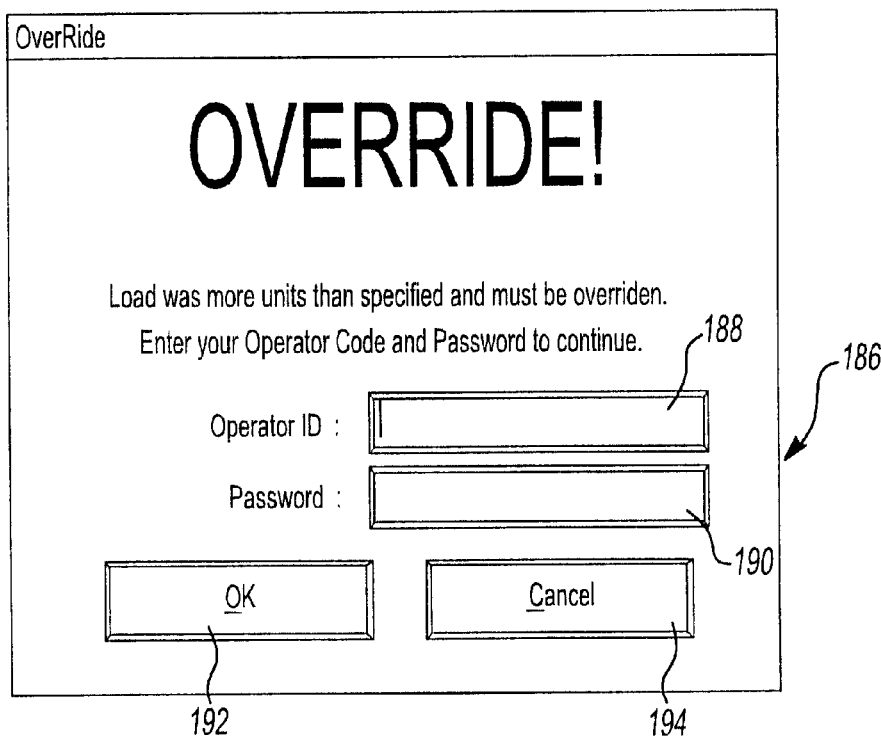
FIG. 22 is an alternate override screen, to that illustrated in FIG. 21, and which is presented upon the portal scanner detecting that an excessive number of cargo units, beyond that which was originally specified.

Referring to FIG. 22, an alternate override screen 186, to that illustrated in FIG. 21, is presented upon the portal scanner detecting that an excessive number of cargo units, beyond that which was originally specified. Again operator ID 188 and Password 190 fields and OK 192 and CANCEL 194 buttons are presented. Overriding the load with a successful operator ID and Password will instruct the portal 10 to issue a green light 86, even though the load has not been fully scanned and it is further understood that the operator code will be significant in the export of date from the labels.

Figure 23:
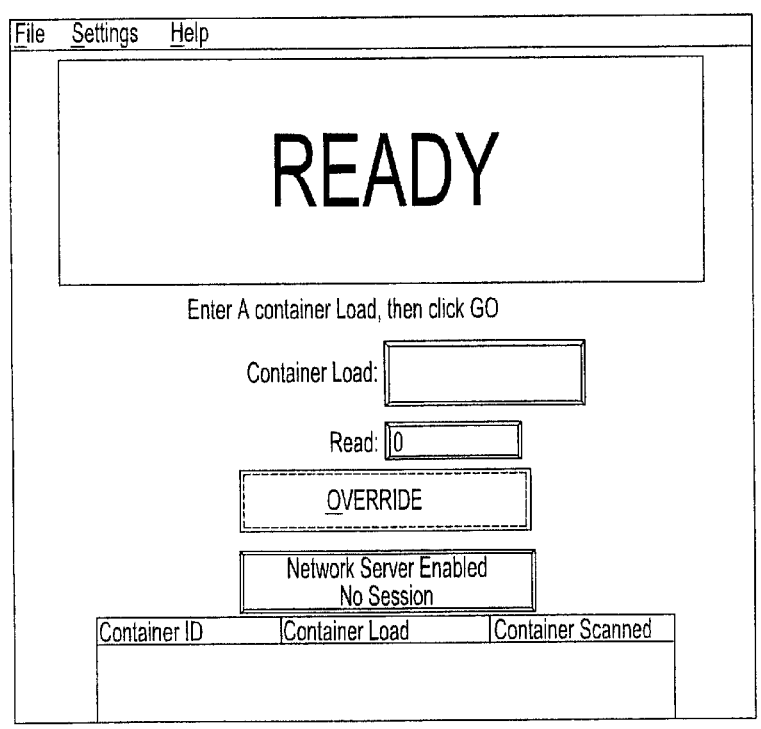
FIG. 23 is a unit load evaluator screen illustration, according to a further preferred variant of the software operating system of the present invention, and in which, rather than the operator inputting a load amount to be scanned, the portal will automatically scan and identify the tags as they progress through the portal, such scanning automatically identifying loads that have been pre-entered into the system.

Referring now to screen illustration 196 of FIG. 23, a unit load evaluator screen option is presented according to a further preferred variant of the software operating system of the present invention. The screen illustration of FIG. 23 is similar to that of FIG. 16 in the initial embodiment, however, and according to this variant, rather than the operator being required to input a load amount to be scanned, the system software is capable of instructing the portal to automatically scan and identify the tags as they progress through the portal. Such scanning automatically identifies loads that have been pre-entered into the system and maintained within the inventory manifests under standardized load settings.

Figure 24:
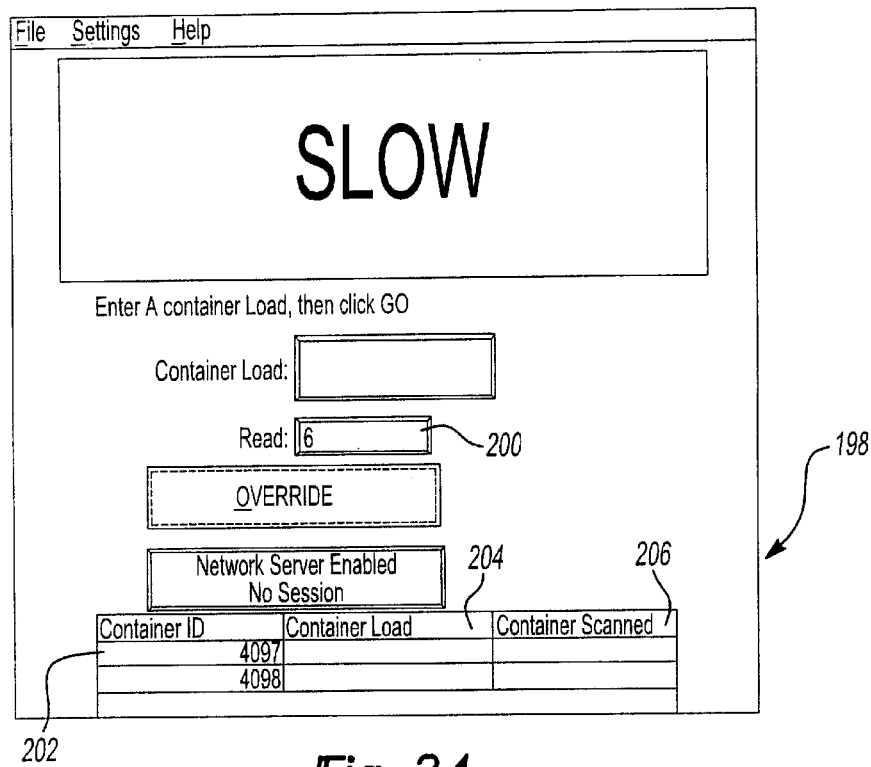
FIG. 24 is a succeeding screen illustration, to that shown in FIG. 23, and showing the unit load evaluator software as it progresses through its scanning protocol, having at this point scanned 6 tags that have passed through the field.

FIG. 24 illustrates, at 198, a succeeding screen illustration, to that shown in FIG. 23, and showing the unit load evaluator software as it progresses through its scanning protocol, having at this point scanned 6 tags (see field 200) that have passed through the field. Also evident in FIG. 24 are field parameters 202, 204, and 206 automatically updated by the ULE software onto the remote display 198 and corresponding to container identification numbers, individual container loads and numbers of containers scanned.

Figure 25:
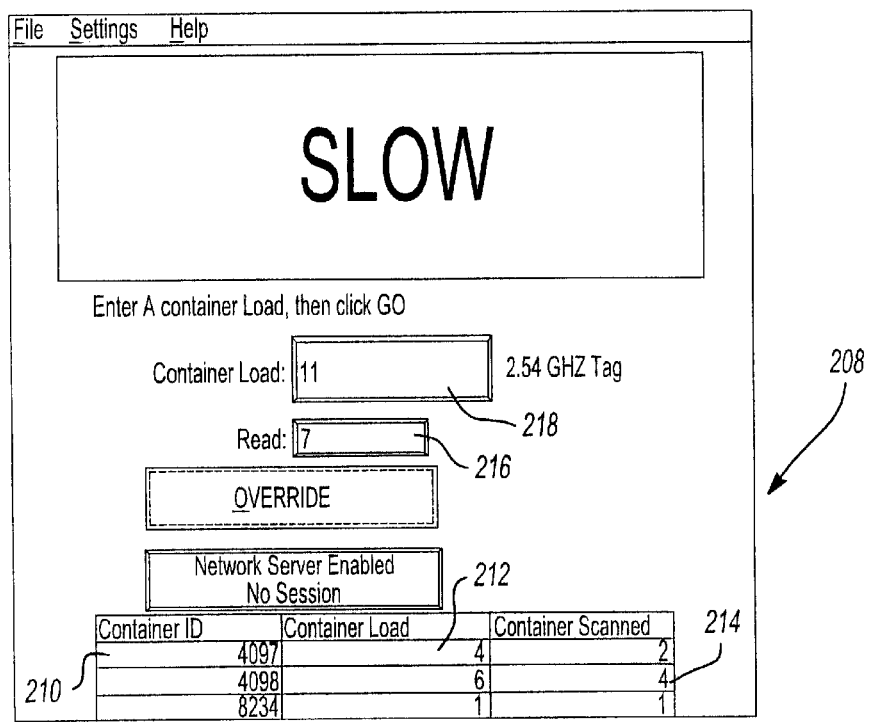
FIG. 25 is a further succeeding screen illustration and in which a total complement of the container load field has been scanned and identified as to container identification number, container load, and number of containers scanned.

Referring now to FIG. 25 a further succeeding screen illustration 208 indicates, in fields 210, 212 and 214 that an incrementing container load field is in the process of being scanned and identified, again as to container identification number, container load, and number of containers scanned. Accordingly, field 216 indicates that seven (7) containers out of eleven (11) containers (field 218) have at this point been scanned.

Figure 26:
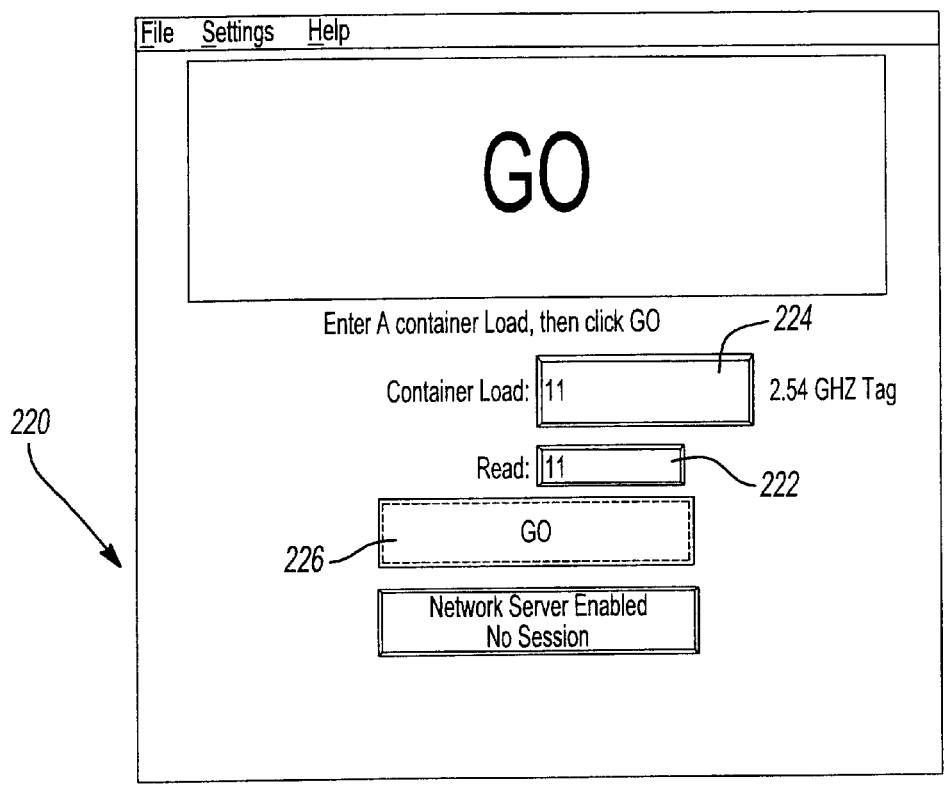
FIG. 26 is a further succeeding unit load evaluator screen illustration signifying that the portal has read all of the tags in the screen of FIG. 25.

FIG. 26 illustrates a further succeeding unit load evaluator screen 220 (similar to the screen 158 of FIG. 15) and signifying that the portal has read all of the tags in the screen of FIG. 25. See eleven (11) containers 222 of eleven (11) 224 read and GO button 226 which permits the program to proceed and reset.

Figure 27:
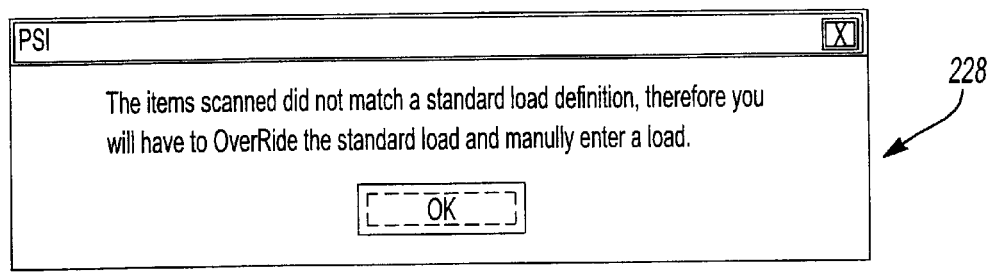
FIG. 27 is an override notification screen for identifying an excessive number of containers beyond those previously identified.
Figure 28:
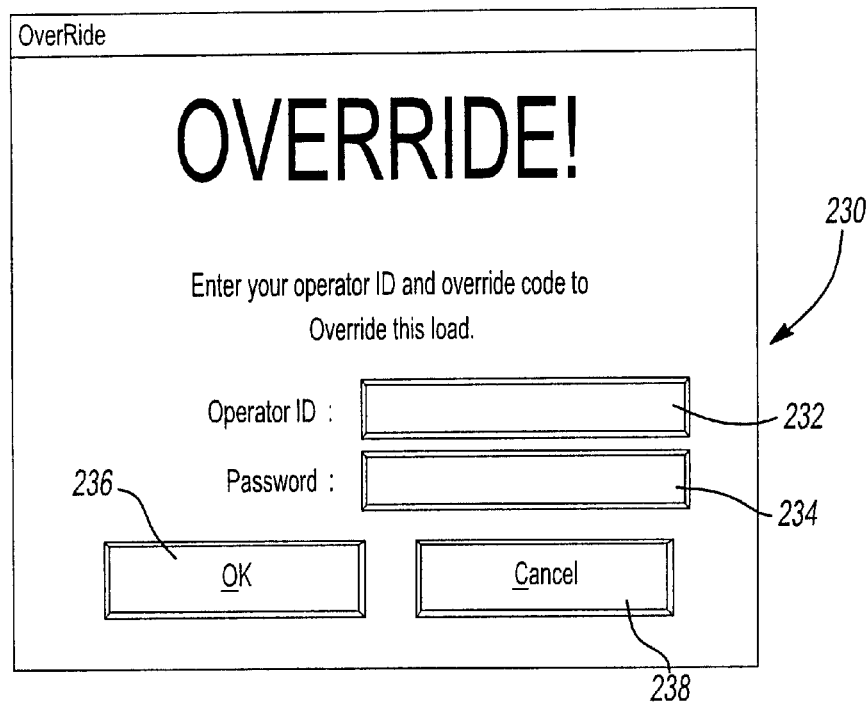
FIG. 28 is a substantial repeat of the screen illustration of FIG. 21 and provides operator and password key entries for effecting override of the system software.
Figure 29:
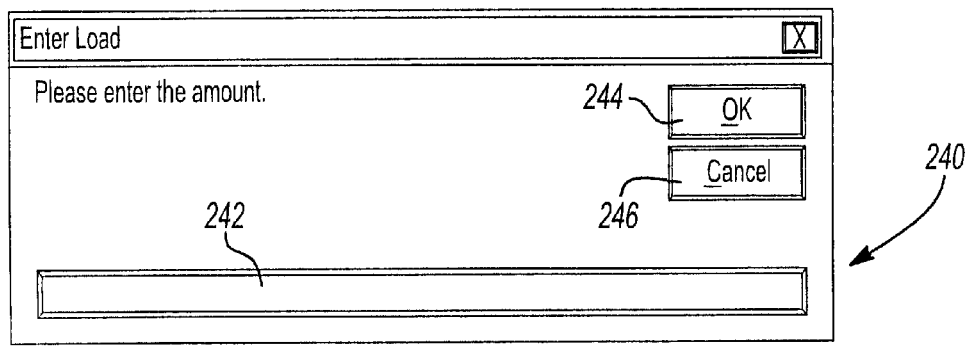
FIG. 29 is a further succeeding screen and which permits an operator to manually key enter a load amount, following which the portal scanning interfaces (PSI) is reset to look for only the certain number of tags key entered by the forklift operator.

FIG. 27 is an override notification screen 228 for identifying an excessive number of containers beyond those previously identified. FIG. 28 (at 230) is a substantial repeat of the screen illustration at 176 in FIG. 21 and provides operator 232 and password 234 key entries for effecting override of the system software, as well as again OK 236 and Cancel 238 buttons. FIG. 29 is a further succeeding screen 240 and which permits an operator to manually key enter a load amount (field 242 and see also OK 244 and reset 246 buttons), following which the portal scanning interfaces (PSI) is reset to look for only the certain number of tags key entered by the forklift operator. In this condition, the portal software will continue to scan for tags until either the load is completely scanned or until the operator again overrides the system.

Figure 30:
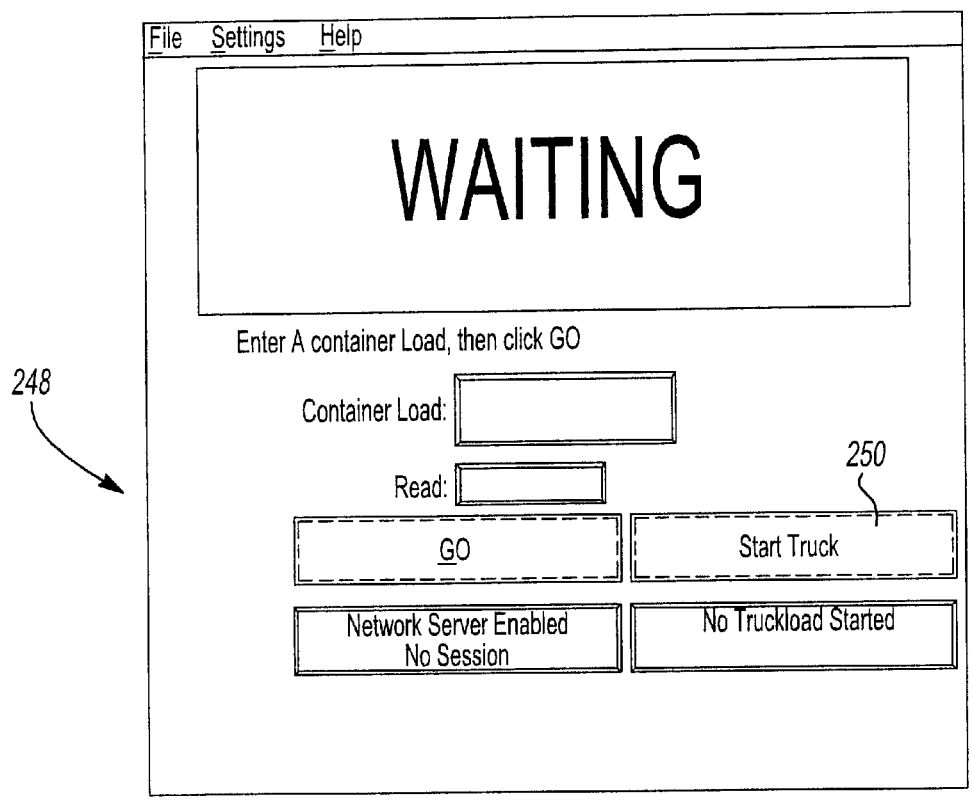
FIG. 30 is a start screen integrated shipping solution (ISS) screen illustration, according to a yet further variant of the operating software component of the present invention, and which, upon activation of the Start Truck button, initiates assembly of a file corresponding to a given total quantity of freight loaded upon the truck and for printout or export to shipping programs and other third party applications.

Referring now to FIG. 30, an integrated shipping solution (ISS) screen illustration 248 is provided, according to a yet further variant of the operating software component of the present invention. The ISS screen 248, upon activation of the Start Truck button 250, provides for the assembly of a file corresponding to a given total quantity of freight to be loaded upon the truck and for printout or export to shipping programs and other third party applications. Referring again to FIG. 13, step 252 corresponds to this data export step.

Figure 31:
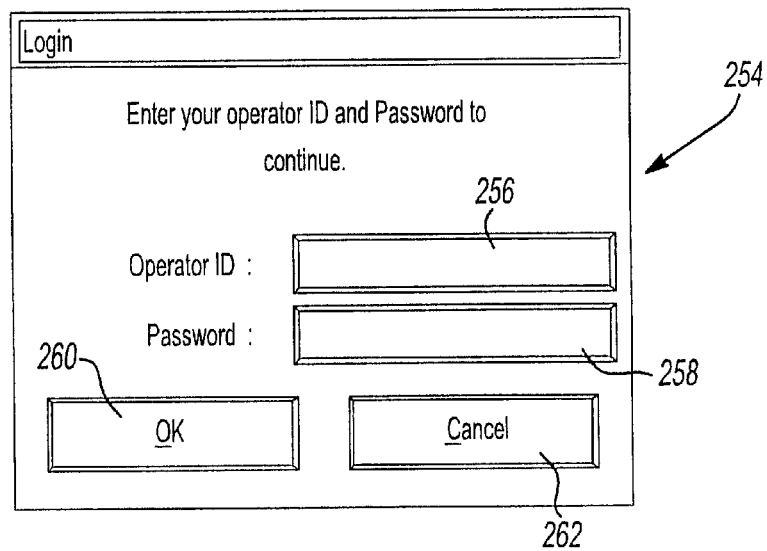
FIG. 31 is a screen illustration of operator identification and password entry fields for initiating the ISS program.
Figure 32:
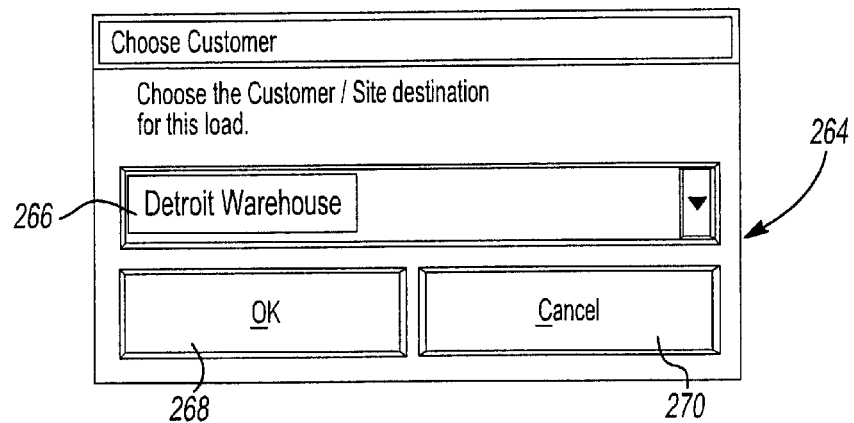
FIG. 32 is a succeeding screen illustration for designating a destination location for the ISS program and which is inputted into a table of predefined locations.

Proceeding to FIG. 31 a screen 254 provides for operator identification and password entry fields (see at 256 and 258, respectively, as well as OK 260 and Cancel 262 buttons) for initiating the ISS program. FIG. 32 is a succeeding screen illustration 264 for designating a destination location (see field 266) for the ISS program and which is inputted into a table of predefined locations. Again OK 268 and Cancel 270 options are provided for screen illustration 264.

Figure 33:
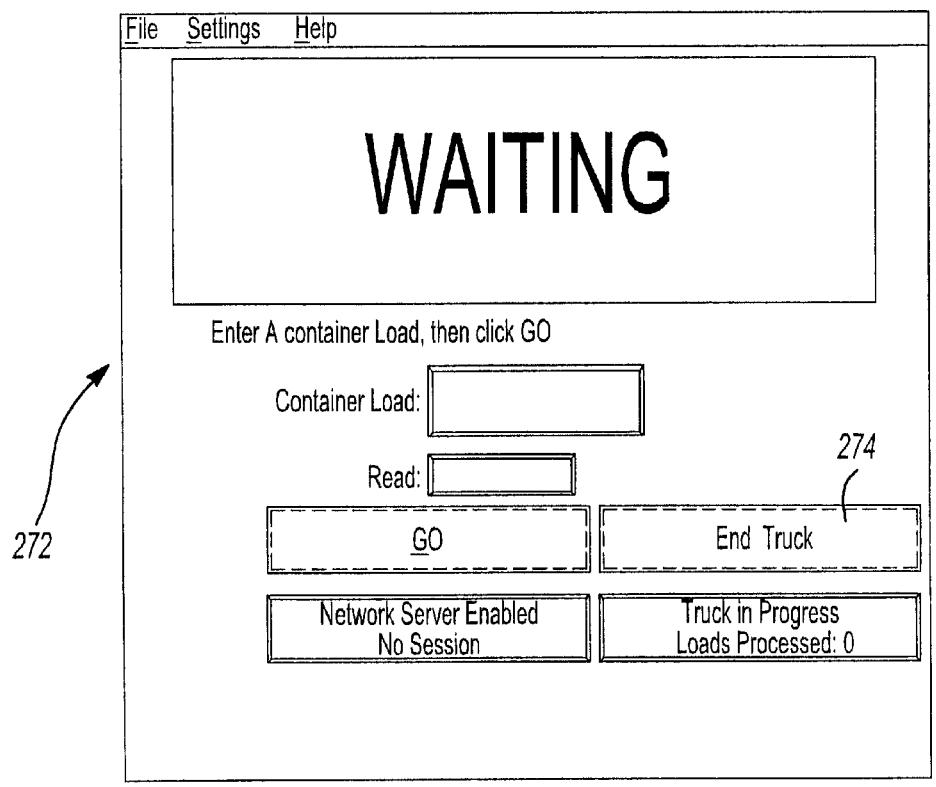
FIG. 33 is a yet succeeding screen illustration which identified a number of loads that have processed for the truck and further provides an option for ending the ISS program.

Referring to 272 in FIG. 33, a yet succeeding screen illustration is provided which identifies a number of loads that have processed for the truck and further provides an option for ending the ISS program. See again End Truck button 274.

Figure 34:
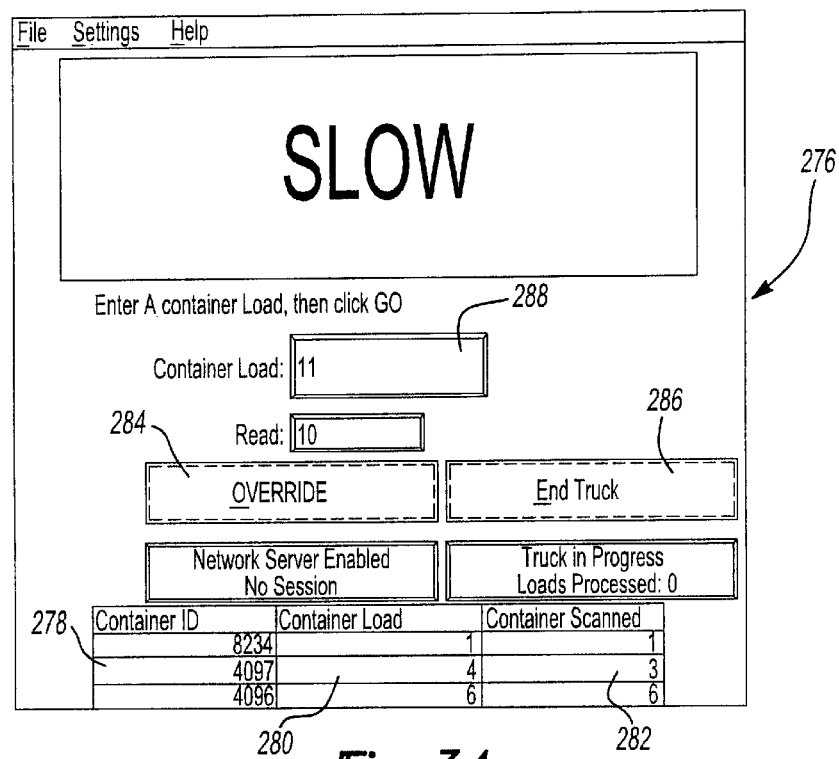
FIG. 34 is an "in progress" load screen illustration, associated with the ISS program, and during which the program cannot be ended until scanning of the given load is completed.

FIG. 34 is an "in progress" load screen illustration 276, associated with the ISS program, and during which the program cannot be ended until scanning of the given load is completed. Again provided in the illustration 274 are container ID 278, container load 280, number of containers scanned 282, as well as override button 284, End Truck (end ISS subroutine) button 286 and total container load designation button 288. Once a load is finished, the loads processed will be incremented and then the user can end the truck (such as again by selecting button 286). At this point, the information can be exported for that truck or a shipper can be printed off to show the load details of that truck.

Figure 35:
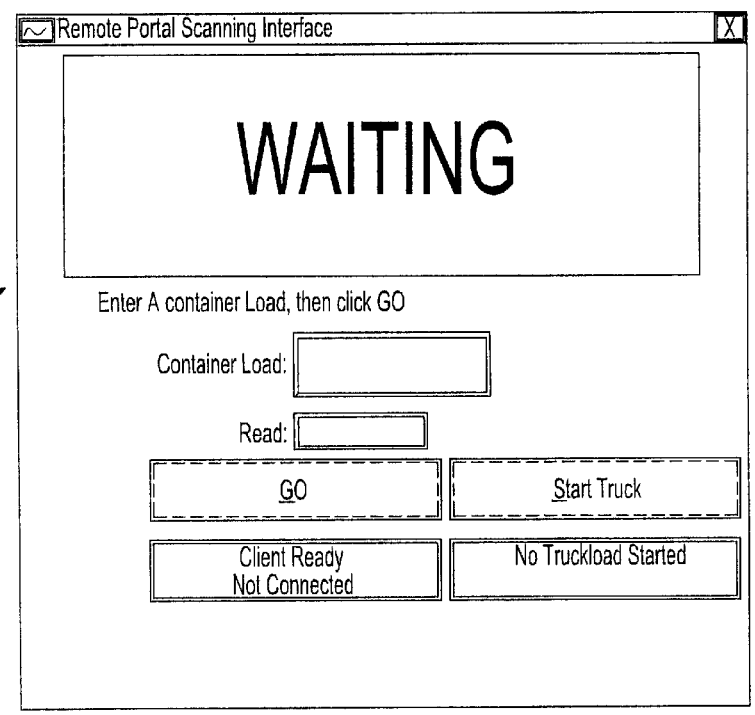
FIG. 35 is a screen illustration of a remote portal scanning interface (RPSI) according to a further preferred variant of the software component of the present invention and which works with remote located terminals and touch screens to communicate the portal scanning interface (PSI) program that controls the portal, in particular example for mounting a touch screen computer onto the forklift such as is also illustrated in FIG. 5.

Referring now to FIG. 35 is a screen illustration 290 is given of the remote portal scanning interface (RPSI), as previously described and according to a further preferred variant of the software component of the present invention. As discussed, the RPSI module interfaces with the remote located terminal and its touch screens to communicate the portal scanning interface (PSI) program that controls the portal, in particular by example for mounting a touch screen computer onto the forklift such as previously illustrated in FIG. 5. The screen illustration 290 is substantially identical to that identified in earlier variants.

Figure 36:
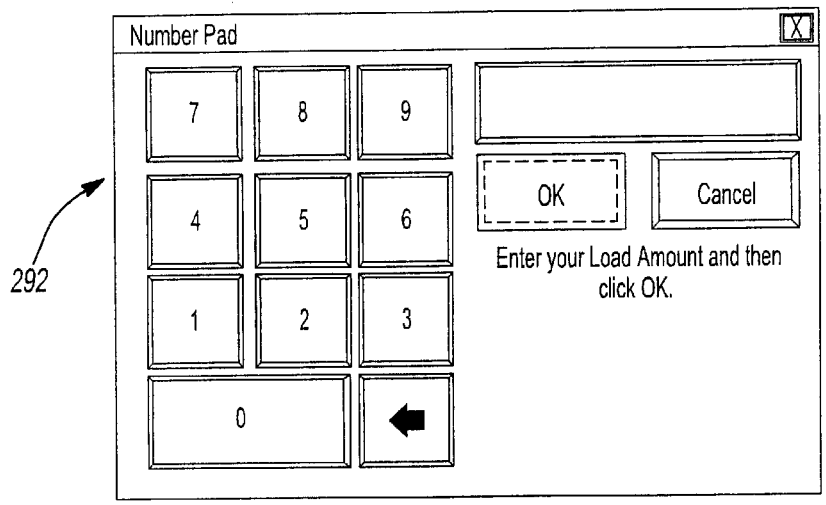
FIG. 36 is a screen illustration of a calculator entry pad used for entering Load information, operator identification, password, or other information.

Referring to FIG. 36, a screen illustration 292 is shown of a calculator entry pad used for entering Load information in addition to operator identification, password, or other information. Since, according to the preferred variant, there is no keyboard connected to the remote terminals, the operator is able to utilize the touch pad to enter any pertinent information.

Figure 37:
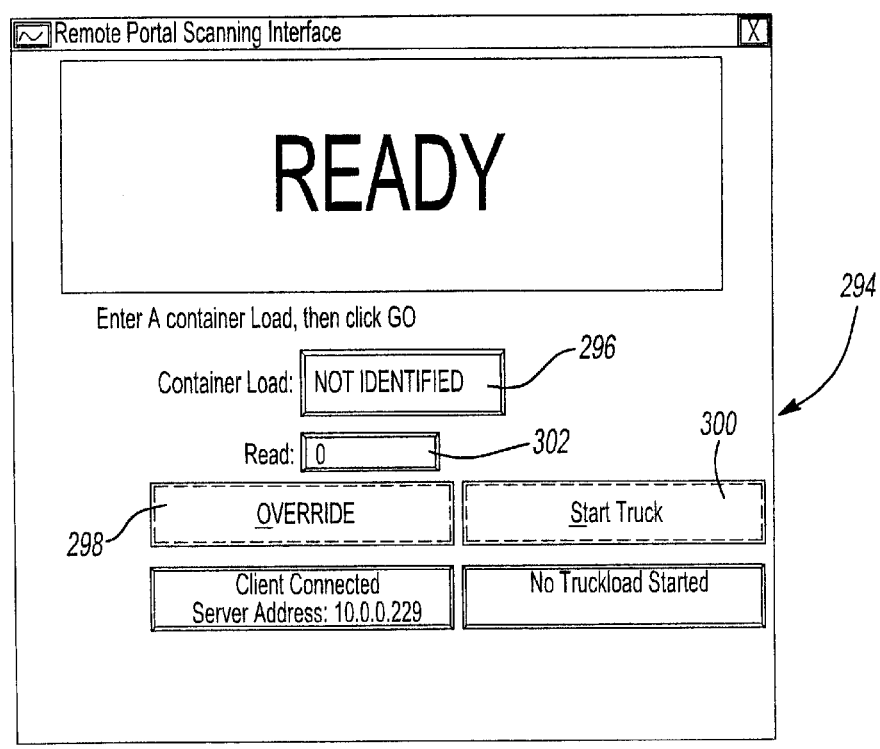
FIG. 37 a further screen illustration of the RPSI software and which illustrates, in contrast to the container identification number and quantity grid presented by the unit load evaluator (ULE) software, a container load identified/not identified field and which the RPSI software will automatically fill in the Load field upon identification.

FIG. 37 illustrates, at 294, a further screen illustration of the RPSI software and which illustrates, in contrast to the container identification number and quantity grid presented by the unit load evaluator (ULE) software, a container load identified/not identified field 296 and which the RPSI software will automatically fill in the Load field upon identification. Additional override 298 and start truck 300 buttons are also evident, as is a field 302 which indicates if any containers have been read.

Figure 38:
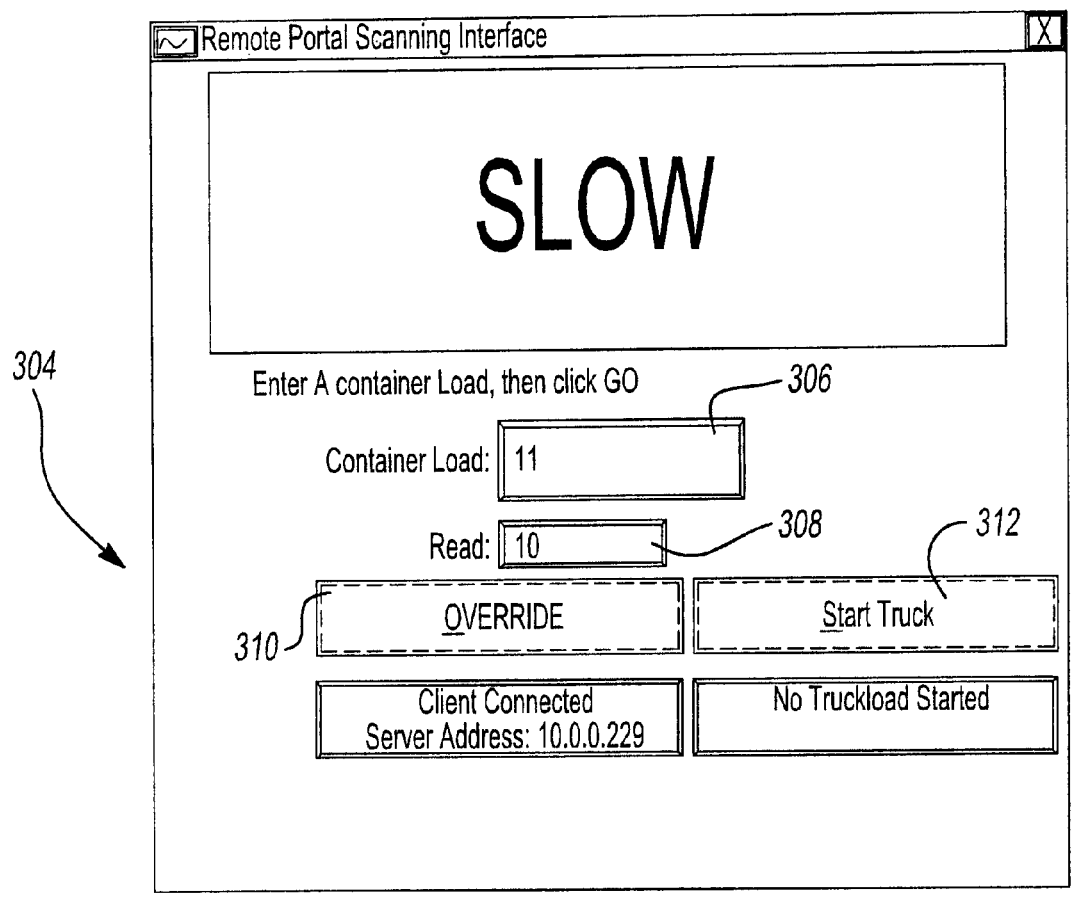
FIG. 38 is a succeeding screen illustration, to that identified in FIG. 37, and in which the RPSI software identifies a correct container load.

Referring finally to FIG. 38, a succeeding screen illustration 304, to that identified in FIG. 37, is presented and in which the RPSI software is in the process of identifying a correct container load. See in particular container load field 306, read field 308, Override button 310 and Start Truck button 312. Finally, and referring back again to FIG. 13, step 314 concludes by indicating that the operator proceed with going back to fork a next unit load and may correspond to either an intermediate or final step of the ISS or RPSI subroutines.

The structural aspects of the portal, with its scanner and array of antennas defines one individual, and separately protectable aspect of the present invention. The software program embodying a code for use with a computer writeable media is also claimed as part of the present invention. The code includes, at a minimum, a first subroutine for interfacing an RFID scanner with an inventory manifest compiled in a computer readable media, a second subroutine for incrementing readings of labels corresponding to a predetermined quantity of cargo and a third subroutine for authorizing transport of the cargo upon reading a correct number of labels.

Having described our invention, additional preferred embodiments will become evident to those skilled in the art to which it pertains and without deviating from the scope of the appended claims.

We claim:

1. A radio frequency identification (RFID) capture system for identifying and recording information parameters associated with cargo items, said system comprising:

a choke point portal defining a doorway through which passes a plurality of the cargo items in transit from a first location to a second location, said portal including at least one radio frequency scanner and at least one antenna in operative communication with said scanner for issuing a radio frequency signal;

a plurality of radio frequency sensitive labels, each of said labels being affixed to a selected one of the cargo items; and a processor based operating system in interfacing communication with said portal scanner and, in response to each of said labels emitting a signal detectable by said antennas as the cargo items are transported to the second location, a processor in operative communication with said antennas capturing and comparing information derived from said labels with an inventory manifest held in a computer readable medium and for authorizing shipping of the cargo items upon reading a correct number of labels.

2. The RFID capture system as described in claim 1, said portal further comprising first and second spaced apart and upwardly extending sides, a top extending in crosswise and interconnecting fashion between said upwardly extending sides, a plurality of antennas being located along said sides and top and, in combination, scanning a three dimensional space preceding said portal doorway.

3. The RFID capture system as described in claim 1, said processor based operating system further comprising a software program incorporated into a location situated server.

4. The RFID capture system as described in claim 3, further comprising a remote terminal interfacing with said location situated server.

5. A radio frequency identification (REID) capture system for identifying and recording information parameters associated with cargo items, said system comprising:

a choke point portal defining a doorway through which passes a plurality of the cargo items in transit from a first location to a second location, said portal further comprising first and second spaced apart and upwardly extending sides, a top extending in crosswise and interconnecting fashion between said upwardly extending sides;

said portal including at least one radio frequency scanner and a plurality of antennas located along said sides and said top and in operative communication with said scanner for issuing a radio frequency signal, said plurality of antennas further comprising a first sub-plurality of three antennas mounted in an array along said first upwardly extending side, a second plurality of three antennas mounted in an array along said second upwardly extending side, and a third sub-plurality of three antennas mounted in an array along said interconnecting top so that said antennas scan a three-dimensional space preceding said portal doorway;

a plurality of radio frequency sensitive labels, each of said labels being affixed to a selected one of the cargo items; and a processor based operating system in interfacing communication with said portal scanner and, in response to each of said labels emitting a signal detectable by said antennas, a processor in operative communication with said antennas capturing and comparing information derived from said labels with an inventory manifest held in a computer readable medium.

6. The RFID capture system as described in claim 5, at least one of said sub-pluralities of antennas being arranged at offsetting angular increments relative to one another.

7. The RFID capture system as described in claim 5, said portal further comprising a power supply and a serial port connection for communicating with said processor based operating system.

8. The RFID capture system as described in claim 5, said portal further comprising a power source and a central processor unit (CPU), with output serial port, said CPU being networked to a server to communicate with the processor based operating system.

9. A radio frequency identification (RFID) capture system for identifying and recording information parameters associated with cargo items, said system comprising:

a choke point portal defining a doorway through which passes a plurality of the cargo items in transit from a first location to a second location, said portal including at least one radio frequency scanner and at least one antenna in operative communication with said scanner for issuing a radio frequency signal;

a plurality of radio frequency sensitive labels, each of said labels being affixed to a selected one of the cargo items;

a processor based operating system comprising a software program incorporated into a location situated server, a remote terminal interfacing with said location situated server, said remote terminal further comprising a portable processor device including a touch screen, said device being mounted upon an intermediate cargo transport vehicle; and said operating system in interfacing communication with said portal scanner and, in response to each of said labels emitting a signal detectable by said antennas, a processor in operative communication with said antennas capturing and comparing information derived from said labels with an inventory manifest held in a computer readable medium.

10. The RFID capture system as described in claim 9, said remote terminal further comprising an operator key entry screen for inputting a quantity of cargo to be transported by said cargo transport vehicle.

11. The RFID capture system as described in claim 9, said remote terminal further comprising manual override capability in the event of an improper reading of said plurality of labels.

12. The RFID capture system as described in claim 11, said software program further comprising a remote portal scanning interface (RPSI) module, interfacing said remote located terminal with a portal scanning interface (PSI) module, and thereby allowing an operator of the intermediate cargo transport vehicle to remotely control the portal.

13. The RFID capture system as described in claim 12, said software program further comprising a customer order interface (COI) allowing orders to be entered into said operating system and which can then be selected from said PSI or RPSI modules for filling.

14. The RFID capture system as described in claim 9, said software program further comprising a unit load evaluation (ULE) subroutine for automatically identifying said labels and standard loads associated with said labels and which are stored within said inventory manifest.

15. The RFID capture system as described in claim 9, said software program further comprising an integrated shipping solution (ISS) subroutine for compiling, into a file, information corresponding to a given quantity of cargo.

16. The RFID capture system as described in claim 15, said file capable of being exported to third party programs and applications.

17. A radio frequency identification (RFID) capture system for identifying and recording information parameters associated with cargo items, said system comprising:

a choke point portal defining a doorway through which passes a plurality of the cargo items in transit from a first location to a second location, said portal including at least one radio frequency scanner and at least one antenna in operative communication with said scanner for issuing a radio frequency signal;

a plurality of radio frequency sensitive labels, each of said labels being affixed to a selected one of the cargo items;

a processor based operating system comprising a software program incorporated into a location situated server, said program further comprising subroutines for designating a first inactive condition, a second succeeding and ready condition, a third succeeding and label scanning/reading condition and a fourth completed condition; and said operating system in interfacing communication with said portal scanner and, in response to each of said labels emitting a signal detectable by said antennas, a processor in operative communication with said antennas capturing and comparing information derived from said labels with an inventory manifest held in a computer readable medium.

18. The RFID capture system as described in claim 17, further comprising a traffic lamp signal in proximate location to said portal and communicable by said processor operating system, said lamp signal including first, second, third and fourth individually colored light portions which correspond, respectively, to each of said first, second third and fourth subroutine conditions.

* * * * *